(12) United States Patent
Fahrenbruch et al.

(10) Patent No.: US 7,977,928 B2
(45) Date of Patent: Jul. 12, 2011

(54) METHOD AND APPARATUS FOR MODIFYING RIGHT HALF-PLANE ZERO IN A CASCADED DC-DC BUCK-BOOST CONVERTER

(75) Inventors: Shawn Anthony Fahrenbruch, Tustin, CA (US); Simon Kahn, Jerusalem (IL)

(73) Assignee: Microsemi Corporation, Garden Grove, CA (US)

( * ) Notice: Subject to any disclaimer, the term of this patent is extended or adjusted under 35 U.S.C. 154(b) by 380 days.

(21) Appl. No.: 12/405,255

(22) Filed: Mar. 17, 2009

(65) Prior Publication Data
US 2010/0237836 A1    Sep. 23, 2010

(51) Int. Cl.
G05F 1/40 (2006.01)
G05F 1/10 (2006.01)
(52) U.S. Cl. .......................... 323/271; 323/222
(58) Field of Classification Search .......... 323/222–225, 323/268, 271, 282, 285, 288
See application file for complete search history.

(56) References Cited

U.S. PATENT DOCUMENTS

| | | | |
|---|---|---|---|
| 5,894,243 A * | 4/1999 | Hwang | 327/540 |
| 6,348,781 B1 | 2/2002 | Midya et al. | |
| 6,744,647 B2 | 6/2004 | Cohen | |
| 6,788,033 B2 | 9/2004 | Vinclarelli | |
| 7,298,125 B1 | 11/2007 | Ritter | |
| 7,777,457 B2 * | 8/2010 | Haiplik | 323/222 |
| 2010/0231272 A1 * | 9/2010 | Chen et al. | 327/140 |

* cited by examiner

*Primary Examiner* — Matthew Nguyen
(74) *Attorney, Agent, or Firm* — Simon Kahn

(57) ABSTRACT

A method to generate a substantially DC output having a voltage level different than a DC input, constituted of receiving a feedback signal representing at least one of the voltage level and the current level of the generated substantially DC output; relatively emphasizing the high frequency portion of the feedback signal; controlling the buck function of a cascaded buck-boost converter with a first switching signal having a first duty cycle, the first duty cycle being a first function of the received feedback signal responsive to said relatively emphasized high frequency portion; and controlling the boost function with a second switching signal having a second duty cycle, the second duty cycle being a second function of the received feedback signal, wherein the first switching signal and the second switching signal are continuously enabled to facilitate a continuous conduction mode.

20 Claims, 6 Drawing Sheets

METHOD AND APPARATUS FOR MODIFYING RIGHT HALF-PLANE ZERO IN A CASCADED DC-DC BUCK-BOOST CONVERTER

FIELD OF THE INVENTION

This invention relates to a DC-DC power converter and more particularly to a means for improving a loop bandwidth of the DC-DC power converter by emphasizing the high frequency section of the feedback signal controlling the buck portion of the cascaded buck-boost converter.

BACKGROUND OF THE INVENTION

A boost converter, also known as a step-up converter, is a power converter with an output DC voltage greater than its input DC voltage. It is a class of switching-mode power supply containing at least a first electronically controlled switch (e.g., a transistor), at least a first energy storage element (e.g., an inductor), and an additional element such as a diode or a second electronically controlled switch. Typically, the electronically controlled switches and diode are arranged between the inductor and the output, with current being alternately drawn to charge the inductor responsive to the first electronically controlled switch being closed, and passed to a load responsive to the first electronically controlled switch being open. The current goes through the diode or the second electronically controlled switch when it is passed to the load.

A buck converter, also known as a step-down converter, is a power converter with an output DC voltage less than its input DC voltage. It is a class of switching-mode power supply containing at least a third electronically controlled switch (e.g., a transistor), at least a second energy storage element (e.g., an inductor), and an additional element such as a diode or a fourth electronically controlled switch. Typically, the electronically controlled switches and diode are arranged between the input DC power source and the inductor, with current being alternately drawn to charge the inductor through a load responsive to the third electronically controlled switch being closed, and continued to the load discharging the inductor responsive to the third electronically controlled switch being open. The diode or the fourth electronically controlled switch is in series with the inductor when the inductor is discharging to the load.

A classical or a cascaded buck-boost converter, is a power converter with an output DC voltage which can be greater than or less than the input DC voltage. It is a class of switching-mode power supply containing at least two electronically controlled switches, at least one energy storage element (e.g., an inductor), and additional elements such as diodes and/or additional electronically controlled switches. Typically, each terminal of the inductor is coupled to at least one electronically controlled switch.

Both the boost converter and the cascaded buck-boost converter of the prior art exhibit a right-half plane zero in a control to output transfer function when stepping up voltage in a continuous conduction mode. This means, that when a load increases its current draw, a feedback loop of the converter senses a decrease in an output and attempts to compensate by increasing the output. Unfortunately, in an initial stage, the output current drops. For example, a duty cycle is increased to increase a charge time of an inductor to compensate for the increased load. However, until a full switching cycle has passed, the increase in duty cycle results in a decreased discharge time for the inductor, since a period of the switching cycle does not change. The decreased discharge time results in an initial decrease in the output which reinforces the decrease in the output due to the increased load. In order to ensure stability, it is thus necessary to include a relatively low frequency dominant pole into a control loop. The need for such a low frequency dominant pole places an upper limit on a dynamic performance of the converter.

SUMMARY OF THE INVENTION

In view of the above discussion, it is a principal object of the present embodiments to overcome at least some of the disadvantages of prior art. In certain embodiments this is accomplished by an arrangement which allows a designer to move the right-half plane zero to higher frequencies, thereby enabling increased converter bandwidth. In one embodiment, the right-half plane zero is moved to higher frequencies by relatively emphasizing the high frequency portion of the feedback signal fed to the buck portion of the cascaded buck-boost converter.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
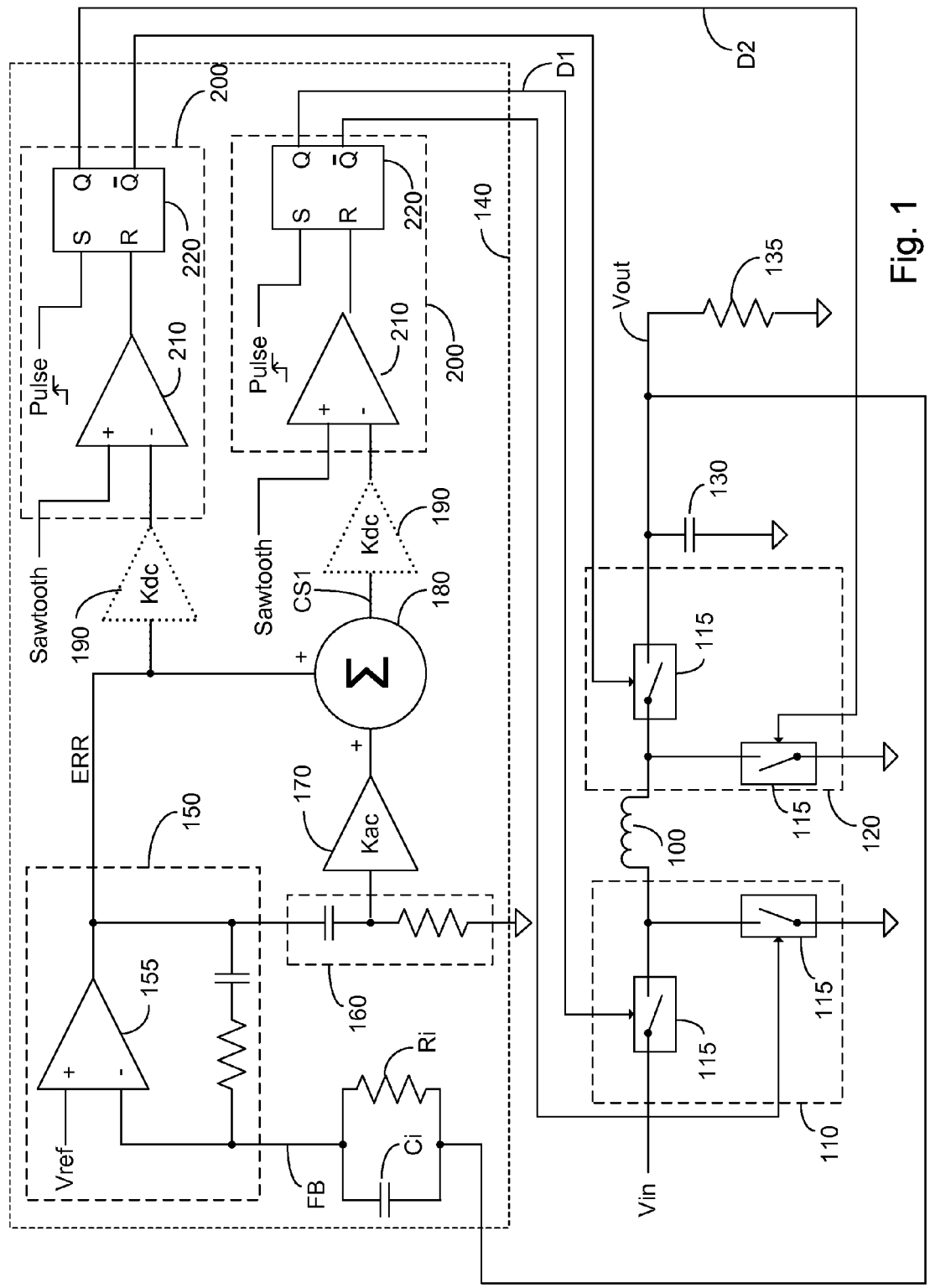
FIG. 1 is a simplified schematic diagram of an exemplary embodiment of a cascaded DC-DC buck-boost converter with means for modifying a right half plane zero (RHPZ) in a transfer function to improve stability over a wider range of frequencies comprising a high pass filter, where both the boost function and the buck function are implemented with a pair of electronically controlled switches.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a simplified schematic diagram of an exemplary embodiment of a cascaded DC-DC buck-boost converter with means for modifying a RHPZ in a transfer function to improve stability over a wider range of frequencies comprising a high pass filter, where both the boost function and the buck function are implemented with a pair of electronically controlled switches. The cascaded DC-DC buck-boost converter comprises: an energy storage element 100 implemented as an inductor; a first switching circuit 110 comprising a first and a second electronically controlled switch 115; a second switching circuit 120 comprising a third and a fourth electronically controlled switch 115; a filter capacitor 130; a load 135; and a control circuitry 140. Control circuitry 140 comprises: an RC filter constituted of a resistor Ri and a capacitor Ci, connected in parallel; an error amplifier 150 comprising an op-amp 155; a high pass filter 160 implemented in a non-limiting manner as a series capacitor and a resistor arranged across the output of the capacitor; an AC gain circuit 170; a summing circuit 180; a first and a second optional DC gain circuit 190; and a first and a second drive signal generating circuit 200 each implemented in a non-limiting manner by a comparator 210 and an RS flip flop 220. In one non-limiting embodiment first, second, third and fourth electronically controlled switches 115 are implemented as FETs, an in particular as MOSFETs.

First switching circuit 110 is coupled between a substantially DC input source, denoted Vin, and a first terminal of inductor 100. In particular first electronically controlled switch 115 is arranged to switchably connect Vin to the first terminal of inductor 100, and second electronically controlled switch 115 is arranged to switchably connect the first terminal of inductor 100 to a common potential. Second switching circuit 120 is coupled between a second terminal of inductor 100 and a substantially DC output, denoted Vout. In particular third electronically controlled switch 115 is arranged to switchably connect the second terminal of inductor 100 to a common potential and fourth electronically controlled switch 115 is arranged to switchably connect the second terminal of inductor 100 to Vout. Filter capacitor 130 is typically coupled across the substantially DC output to reduce output voltage ripple. Load 135 represented by a resistor is also coupled across the substantially DC output. The cascaded DC-DC buck-boost converter is preferably configured to operate in a continuous conduction mode wherein inductor 100 continuously conducts non-zero currents.

Vout is connected via the parallel connected Ri and Ci to the inverting input of op-amp 155 of error amplifier 150, the signal denoted feedback signal FB. The non-inverting input of op-amp 155 is connected to a reference voltage, denoted Vref, consonant with the desired steady state value of feedback signal FB. The output of op-amp 155 is connected to the input of high pass filter 160, to the input of second optional DC gain circuit 190, to a first adding input of summing circuit 180 and via a series connected capacitor and resistor feedback network to the inverting input of op-amp 155. The output of second optional DC gain circuit 190 is connected to the inverting input of comparator 210 of second drive signal generating circuit 200. The output of high pass filter 160 is connected to the input of AC gain circuit 170, and the output of AC gain circuit 170 is connected to a second adding input of summing circuit 180. The output of summing circuit 180 is connected via first optional DC gain circuit 190 to the inverting input of comparator 210 of first drive signal generating circuit 200. The non-inverting input of comparator 210 of each of first and second drive signal generating circuit 200 is connected to a source of a saw tooth waveform, and the output of the respective comparators 210 are respectively connected to the Reset input of the constituent RS flip flop 220. The Set input of each of the RS flip flops 220 is connected to a source of a pulse waveform, the pulse waveform preferably synchronized with the saw tooth waveform such that the rising edge of each pulse of the pulse waveform coincides with the beginning of the rising slope of the saw tooth waveform. RS flip flops 220 are arranged to change state on the rising edge of an input at either the Set or Reset inputs. The non-inverted output of RS flip flop 220 of first drive signal generating circuit 200 represents a first driving signal, denoted D1 and exhibiting a duty cycle d1, and is connected to the control input of first electronically controlled switch 115, and the inverted output of RS flip flop 220 of first drive signal generating circuit 200 is connected to the control input of second electronically controlled switch 115. The non-inverted output of RS flip flop 220 of second drive signal generating circuit 200 represents a second driving signal, denoted D2 and exhibiting a duty cycle d2, and is connected to the control input of third electronically controlled switch 115, and the inverted output of RS flip flop 220 of first drive signal generating circuit 200 is connected to the control input of fourth electronically controlled switch 115.

In operation, Vout is sensed, preferably across load 135, to generate feedback signal FB for control circuitry 140. In the embodiment shown in FIG. 1, the output voltage is filtered by the parallel arrangement of Ri and Ci, to generate feedback signal FB. Feedback signal FB is described herein as sensing the output voltage however this is not meant to be limiting in any way. In another embodiment the output current is sensed, in one particular embodiment by a sense resistor in series with the output, and the sensed current is used to generate feedback signal FB.

Feedback signal FB is provided to error amplifier 150, and in particular to op-amp 155. Error amplifier 150 is operative to compare feedback signal FB with reference voltage Vref and generate an error signal, denoted ERR, responsive to the difference between the feedback signal and Vref. Error signal ERR is fed to high pass filter 160, which is operative to substantially pass portions of error signal ERR with frequencies above a threshold frequency and attenuate portions of error signal ERR with frequencies below the threshold frequency. The high frequency portion of error signal ERR is then amplified by AC gain circuit 170, and the amplified high frequency portion of error signal ERR is then added by summing circuit 180 to error signal ERR. Summing circuit 180 outputs a control signal, denoted CS1, having an emphasized high frequency portion of error signal ERR. Control signal CS1 is optionally amplified by first optional DC gain circuit 190, and fed to first drive signal generating circuit 200. Error signal ERR is optionally amplified by second optional DC gain circuit 190, and fed to second drive signal generating circuit 200.

Each of first and second drive signal generating circuit 200 are operative to compare the respective input signals with the saw tooth waveform, and reset the respective RS flip flop when the value of the saw tooth waveform exceeds the respective input signal. The RS flip flop is set on the rising edge of the pulse, which coincides with the beginning of the saw tooth waveform cycle, thus the portion of the duty cycle for which the non-inverting output of each RS flip flop is positive reflects the value of the signal input to the respective drive signal operating circuit 200. Responsive to the combination of high pass filter 160, AC gain circuit 170, summing circuit 180 and optional DC gain circuit 190, the duty cycle of first driving signal d1 is responsive to an emphasized high frequency portion of the difference between feedback signal FB and reference signal Vref. The duty cycle of second driving signal d2 is responsive to the difference between feedback signal FB and reference signal Vref, preferably without particular emphasis.

As illustrated in the embodiment of FIG. 1, first switching circuit 110 performs a buck function and is implemented with a first pair of electronically controlled switches 115 driven by first driving signal d1 and its complement. Second switching circuit 120 performs a boost function and is implemented with a second pair of electronically controlled switches 115 driven by second driving signal d2 and its complement. Each of first switching circuit 110 and second switching circuit 120 can also be implemented with one electronically controlled switch and a unidirectional electronic valve instead of two electronically controlled switches, as will be described further hereinto below. One of the output voltage level and the current level is controlled at least in part by the duty cycles of first and the second driving signals d1, d2.

Control circuitry 140 of FIG. 1 can advantageously vary duty cycle of first driving signal d1 independently of the duty cycle of second driving signal d2. As explained in further details below, this allows the location of an inherent RHPZ to be moved to a higher frequency and thus improves a loop bandwidth of the cascaded DC-DC buck-boost converter to facilitate a faster response to changes in loads, power supply, or noise.

The gain of first and second optional DC gain circuits 190 may be individually set, and are not required to be the same. In one embodiment, the gains of first and second optional DC gain circuits 190 are substantially similar. In one further embodiment, during steady state operation duty cycle d1 of first drive signal D1 is substantially the same as duty cycle d2 of second drive signal D2.

As described above, a DC-DC boost converter or a cascaded DC-DC buck-boost converter of the prior art has an inherent RHPZ in a transfer function characterizing a relationship between a control port and an output port of the converter. The inherent RHPZ typically places an upper limit on dynamic performance because a relatively low-frequency dominant pole is usually thus included in a control loop to ensure stability. The cascaded DC-DC buck-boost converter described above in which the duty cycle for a buck function can be adjusted independently of the duty cycle for a boost function, and in particular is adjusted responsive to a relatively emphasized high frequency component of the feedback signal, advantageously maintains stability without a need for the relatively low-frequency dominant pole. The DC relationship between the input source (Vin) and the output voltage (Vout) at steady state is not affected and remains as follows: Vout/Vin=d/(1−d), where d is the duty cycle for both the buck function, d1, and the boost function, d2, during steady state.

Figure 4:
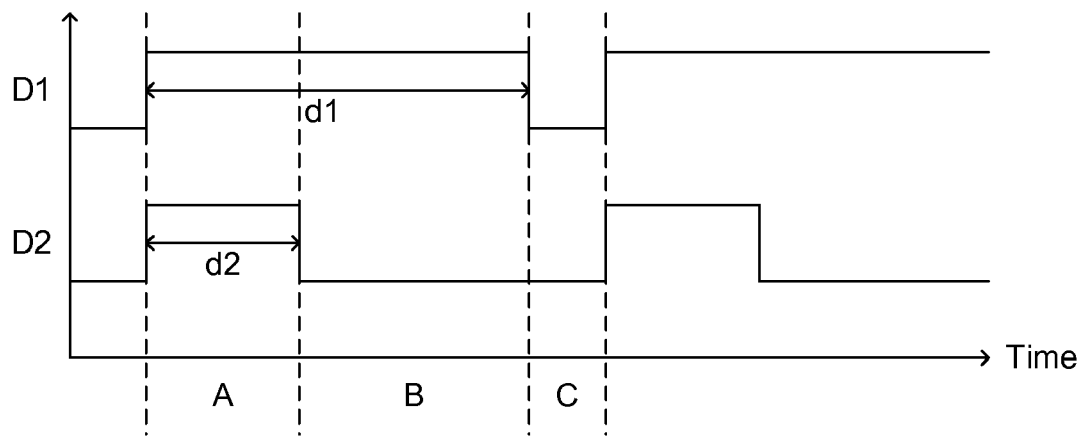
FIG. 4 illustrates a graph of a first and a second drive signal of the embodiment of FIGS. 1-3.

FIG. 4 illustrates a graph of first drive signal D1 and second drive signal D2, in which the x-axis represents time and y-axis represents amplitude in arbitrary units for each of the signals. The period when second drive signal D2 is active, i.e. duty cycle d2, is denoted period A. The period when second drive signal D1 is active, corresponds with duty cycle d1. Period B is defined as the portion of duty cycle d1 which does not overlap d2. Period C is defined as when neither first drive signal D1 nor second drive signal D2 are active.

The following derivation shows how the inherent RHPZ can be modified or moved to a higher frequency in a cascaded DC-DC buck-boost converter in which duty cycle d1 related to a buck function is independently controlled with respect to duty cycle d2 related to a boost function. The equations below are derived with reference to the embodiment of FIG. 1, in which R represents the resistive value of load 135 and C represents the capacitive value of load 135 in parallel with capacitor 130.

During period A, where $0 < t < d2 \ast T$ (duration of $d2 \ast T$):

$$v_{IN} = L \frac{di_L}{dt}$$

$$0 = RC \frac{dv_{OUT}}{dt} + v_{OUT}$$

During period B, where $d2 \ast T < t < d1 \ast T$ (duration of $d1 \ast T - d2 \ast T$):

$$v_{IN} - v_{OUT} = L \frac{di_L}{dt}$$

$$Ri_L = RC \frac{dv_{OUT}}{dt} + v_{OUT}$$

During period C, where $d1 \ast T < t < (1-d1) \ast T$ (duration of $(1-d1) \ast T$):

$$-v_{OUT} = L \frac{di_L}{dt}$$

$$Ri_L = RC \frac{dv_{OUT}}{dt} + v_{OUT}$$

Use state-space averaging to determine the average state equations, i.e., the Inductor Current Equation and Load Capacitor Voltage Equation, respectively:

$$d_1 v_{IN} - (1 - d_2) v_{OUT} = L \frac{di_L}{dt}$$

$$(1 - d_2) Ri_L = RC \frac{dv_{OUT}}{dt} + v_{OUT}$$

Expand the basic quantities into their DC and time-varying components:

$$i_L = I_L + \hat{i}_L$$

$$d_1 = D_1 - \hat{d}_1$$

$$v_{IN} = V_{IN} + \hat{v}_{IN}$$

$$d_2 = D_2 - \hat{d}_2$$

$$v_{OUT} = V_{OUT} + \hat{v}_{OUT}$$

Eliminate the time-varying portions momentarily to derive certain DC relationships utilizing the Inductor Current Equation and Load Capacitor Voltage Equation:

$$V_{OUT} = \frac{V_{IN} D_1}{(1-D_2)}$$

$$I_L = \frac{V_{OUT}}{R(1-D_2)} = \frac{V_{IN} D_1}{R(1-D_2)^2}$$

Expand the Inductor Current Equation:

$$(D_1 + \hat{d}_1)(V_{IN} + \hat{v}_{IN}) - (1 - D_2 - \hat{d}_2)\hat{v}_{OUT} = L\frac{dI_L}{dt} + L\frac{d\hat{i}_L}{dt}$$

Expand the Load Capacitor Voltage equation:

$$(1 - D_2 - \hat{d}_2)R(I_L + \hat{i}_L) = RC\frac{dV_{OUT}}{dt} + RC\frac{d\hat{v}_{OUT}}{dt} + V_{OUT} + \hat{v}_{OUT}$$

Strip out the DC quantities; assume that the AC component of Vin is small; and assume that the multiplied product of all AC components is negligible.

Perform Laplace transforms on remaining AC terms.

$$V_{IN}\hat{d}_1(s) + V_{OUT}\hat{d}_2(s) - (1-D_2)\hat{v}_{OUT}(s) = sL\hat{i}_L$$

$$\hat{i}_L(s) = \frac{I_{DC}}{(1-D_2)}\hat{d}_2(s) + \frac{(sRC+1)}{R(1-D_2)}\hat{v}_{OUT}(s)$$

Combining the above equations yields:

$$\hat{v}_{OUT}(s) = \frac{RV_{IN}(1-D_2)\hat{d}_1(s) + R(1-D_2)V_{OUT} - sLRI_L}{R(1-D_2)^2 + sL + s^2 RLC}$$

$$\hat{v}_{OUT}(s) = \frac{RV_{IN}(1-D_2)\hat{d}_1(s) + \left\{ RD_1 V_{IN} - s\frac{LV_{IN}D_1}{(1-D_2)^2}\right\}\hat{d}_2(s)}{R(1-D_2)^2 + sL + s^2 RLC}$$

Keep in mind that the "d1" duty cycle relates to the "buck" function and the "d2" duty cycle relates to the "boost" function. As a quick examination, if the "d1" duty cycle was at 100% and it had no AC component then there would simply be a "Right Half Plane" zero at $$\omega_{RHP_{ZERO}} = \frac{(1-D_2)^2 R}{L}$$

This is simply the standard RHPZ of any DC-DC boost converter. But, notice that the location of the RHPZ can be altered by manipulating the d1 duty cycle, which relates to the "buck" function.

Referring again to FIG. 1, set the values of $K_{AC}$, $K_{DC}$ and the capacitor and resistor values of high pass filter 160, denoted respectively $R_X$ and $C_X$, so as to satisfy the following relationship:

$$\hat{d}_1(s) = \left[ \frac{s(K_{DC} + K_{AC})R_X C_X + K_{DC}}{sR_X C_X + 1}\right]\hat{d}_2(s)$$

With this arrangement the zero can now be moved to a higher frequency—or even moved into the left hand plane if $K_{AC}$ is chosen as a negative quantity. Moving the zero to a higher frequency in the RHP will now be demonstrated.

The new transfer function (with d1=f(d2)) is now given as:

$$\frac{\hat{v}_{OUT}(s)}{\hat{d}_2(s)} = \frac{RV_{IN}(1-D_2)\left[\frac{s(K_{DC}+K_{AC})}{R_X C_X + K_{DC}}\right]}{sR_X C_X + 1} + R(1-D_2)V_{OUT} - sLRI_L}{s^2 RLC + sL + R(1-D_2)^2}$$

And from the DC relationships above:

$$\frac{\hat{v}_{OUT}(s)}{\hat{d}_2(s)} = \frac{RV_{IN}(1-D_2)\left[\frac{s(K_{DC}+K_{AC})}{R_X C_X + K_{DC}}\right]}{sR_X C_X + 1} + RD_1 V_{IN} - sL\frac{D_1 V_{IN}}{(1-D_2)^2}}{s^2 RLC + sL + R(1-D_2)^2}$$

Assuming $K_{AC}$ is greater than roughly 10 and that $R_X * C_X$ is significantly large, the new right-half plane zero can now be approximately placed at $$\omega_{RHP_{ZERO}} = \frac{-(1-D_2)^2 R}{D_1 L}[RD_1 + (1-D_2)K_{AC}]$$

The complex poles are not changed from the standard equation. The above has been demonstrated for an embodiment in which d1 comprises the DC quantity of d2 plus an amplified AC high pass filtered quantity. However, this is not meant to be limiting in any way. In another embodiment, as will be described further hereinto below, d2 comprises the DC quantity of d1 plus an amplified AC low pass filtered quantity.

Figure 2:
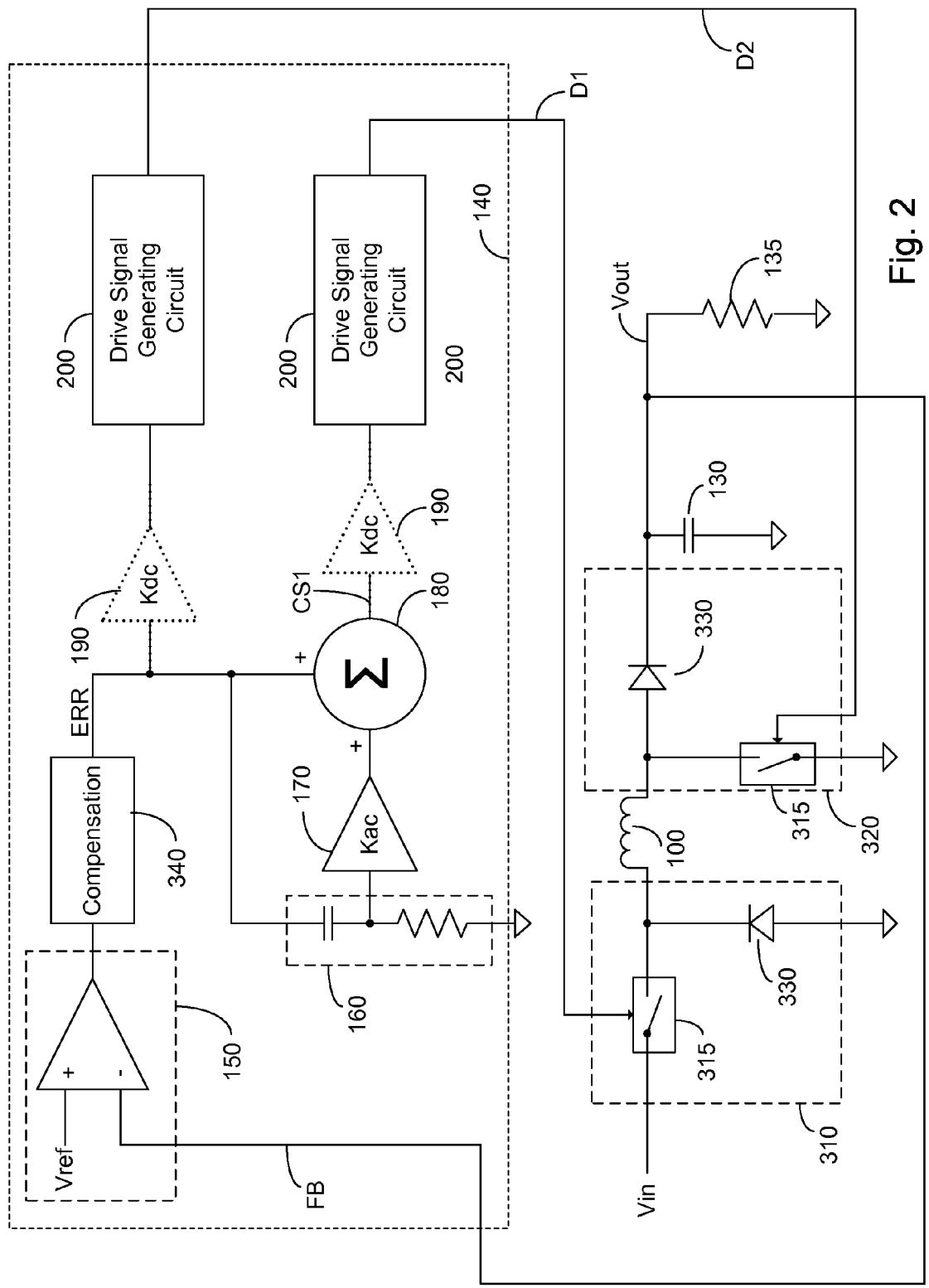
FIG. 2 is a simplified schematic diagram of an exemplary embodiment of a cascaded DC-DC buck-boost converter with means for modifying a RHPZ in a transfer function to improve stability over a wider range of frequencies comprising a high pass filter, where both the boost function and the buck function are implemented with a single electronically controlled switch in cooperation with a unidirectional electronic valve.

FIG. 2 is a simplified schematic diagram of an exemplary embodiment of a cascaded DC-DC buck-boost converter with means for modifying a RHPZ in a transfer function to improve stability over a wider range of frequencies comprising a high pass filter, where both the boost function and the buck function are each implemented with a single electronically controlled switch in cooperation with a unidirectional electronic valve. The cascaded DC-DC buck-boost converter of FIG. 2 comprises: an energy storage element 100 implemented as an inductor; a first switching circuit 310 comprising a first electronically controlled switch 315 and a first unidirectional electronic valve 330, illustrated in a non-limiting manner as a diode; a second switching circuit 320 comprising a second electronically controlled switch 315 and a second unidirectional electronic valve 330, illustrated in a non-limiting manner as a diode; a filter capacitor 130; a load 135; and a control circuitry 140. Control circuitry 340 comprises: an error amplifier 150; a compensation network 340; a high pass filter 160 implemented in a non-limiting manner as a series capacitor and a resistor arranged across the output of the capacitor; an AC gain circuit 170; a summing circuit 180; a first and a second optional DC gain circuit 190; and a first and a second drive signal generating circuit 200. In one non-limiting embodiment first and second electronically controlled switches 315 are implemented as FETs, an in particular as MOSFETs.

First switching circuit 310 is coupled between a substantially DC input source, denoted Vin, and a first terminal of inductor 100. In particular first electronically controlled switch 315 is arranged to switchably connect Vin to the first terminal of inductor 100, and first unidirectional electronic valve 330 is arranged to conduct current when the voltage at the first terminal of inductor 100 is at a lower potential than a common potential. Second switching circuit 320 is coupled between a second terminal of inductor 100 and a substantially DC output, denoted Vout. In particular second electronically controlled switch 115 is arranged to switchably connect the second terminal of inductor 100 to a common potential and second unidirectional electronic valve 330 is arranged to conduct current when the potential at Vout is less than the potential at the second terminal of inductor 100. Filter capacitor 130 is typically coupled across the substantially DC output to reduce output voltage ripple. Load 135 represented by a resistor is also coupled across the substantially DC output. The cascaded DC-DC buck-boost converter is preferably configured to operate in a continuous conduction mode wherein inductor 100 continuously conducts non-zero currents.

Vout is connected to the inverting input of error amplifier 150, the signal denoted feedback signal FB. The non-inverting input of error amplifier 150 is connected to a reference voltage, denoted Vref, consonant with the desired steady state value of feedback signal FB. The output of error amplifier 150 is connected to compensation network 340, which is meant specifically to comprise any feedback compensation required for error amplifier 150. In one particular embodiment, error amplifier 150 is constituted of an op-amp and a serially connected capacitor and resistor network as described above in relation to FIG. 1, and compensation network 340 replaces the filter of Ri and Ci.

The output of compensation network 340 is connected to the input of high pass filter 160, to the input of second optional DC gain circuit 190 and to a first adding input of summing circuit 180. The output of second optional DC gain circuit 190 is connected to the input of second drive signal generating circuit 200, which may be implemented in a non-limiting manner as described above in relation to FIG. 1. The output of high pass filter 160 is connected to the input of AC gain circuit 170, and the output of AC gain circuit 170 is connected to a second adding input of summing circuit 180. The output of summing circuit 180 is connected via first optional DC gain circuit 190 to the input of first drive signal generating circuit 200, which may be implemented in a non-limiting manner as described above in relation to FIG. 1. The output of first drive signal generating circuit 200 represents a first driving signal, denoted D1 and exhibiting a duty cycle d1, and is connected to the control input of first electronically controlled switch 315. The output of second drive signal generating circuit 200 represents a second driving signal, denoted D2 and exhibiting a duty cycle d2, and is connected to the control input of second electronically controlled switch 315.

In operation, the cascaded DC-DC buck-boost converter of FIG. 2 operates in all manners similar to that of FIG. 1, described above, with the exception that second and fourth electronically controlled switches 115 are replaced with first and second unidirectional electronic valves 330, respectively.

Figure 3:
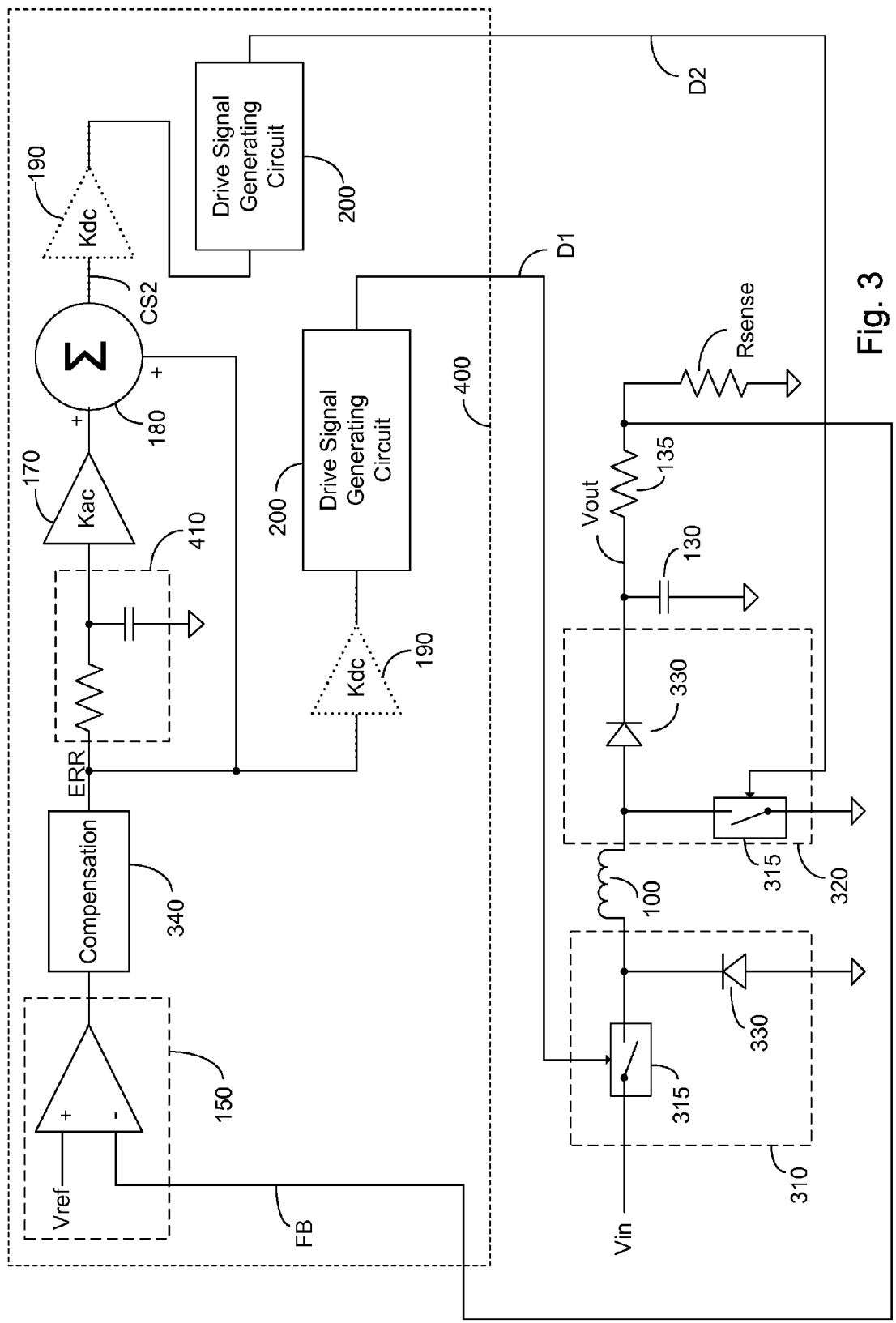
FIG. 3 is a simplified schematic diagram of an exemplary embodiment of a cascaded DC-DC buck-boost converter with means for modifying a RHPZ in a transfer function to improve stability over a wider range of frequencies comprising a low pass filter, where both the boost function and the buck function are implemented with a single electronically controlled switch in cooperation with a unidirectional electronic valve.

FIG. 3 is a simplified schematic diagram of an exemplary embodiment of a cascaded DC-DC buck-boost converter with means for modifying a RHPZ in a transfer function to improve stability over a wider range of frequencies comprising a low pass filter, where both the boost function and the buck function are implemented with a single electronically controlled switch in cooperation with a unidirectional electronic valve. The cascaded DC-DC buck-boost converter of FIG. 3 comprises: an energy storage element 100 implemented as an inductor; a first switching circuit 310 comprising a first electronically controlled switch 315 and a first unidirectional electronic valve 330, illustrated in a non-limiting manner as a diode; a second switching circuit 320 comprising a second electronically controlled switch 315 and a second unidirectional electronic valve 330; a filter capacitor 130; a load 135; a current sense resistor Rsense and a control circuitry 400. Control circuitry 400 comprises: an error amplifier 150; a compensation network 340; a low pass filter 410 implemented in a non-limiting manner as a series resistor and a capacitor arranged across the output of the resistor to a common potential; an AC gain circuit 170; a summing circuit 180; a first and a second optional DC gain circuit 190; and a first and a second drive signal generating circuit 200. In one non-limiting embodiment first and second electronically controlled switches 315 are implemented as FETs, an in particular as MOSFETs.

First switching circuit 310 is coupled between a substantially DC input source, denoted Vin, and a first terminal of inductor 100. In particular first electronically controlled switch 315 is arranged to switchably connect Vin to the first terminal of inductor 100, and first unidirectional electronic valve 330 is arranged to conduct current when the voltage at the first terminal of inductor 100 is at a lower potential than a common potential. Second switching circuit 320 is coupled between a second terminal of inductor 100 and a substantially DC output, denoted Vout. In particular second electronically controlled switch 115 is arranged to switchably connect the second terminal of inductor 100 to a common potential and second unidirectional electronic valve 330 is arranged to conduct current when the potential at Vout is less than the potential at the second terminal of inductor 100. Filter capacitor 130 is typically coupled across the substantially DC output to reduce output voltage ripple. A first end of load 135 represented by a resistor is also coupled across the substantially DC output, and the second end of load 135 is coupled through sense resistor Rsense to the common potential. The cascaded DC-DC buck-boost converter is preferably configured to operate in a continuous conduction mode wherein inductor 100 continuously conducts non-zero currents.

The first end of Rsense is connected to the inverting input of error amplifier 150, the signal denoted feedback signal FB. The non-inverting input of error amplifier 150 is connected to a reference voltage, denoted Vref, consonant with the desired steady state value of feedback signal FB. The output of error amplifier 150 is connected to compensation network 340, which is meant specifically to comprise any feedback compensation required for error amplifier 150. In one particular embodiment, error amplifier 150 is constituted of an op-amp and a serially connected capacitor and resistor network as described above in relation to FIG. 1, and compensation network 340 replaces the filter of Ri and Ci.

The output of compensation network 340 is connected to the input of low pass filter 410, to the input of first optional DC gain circuit 190 and to a first adding input of summing circuit 180. The output of first optional DC gain circuit 190 is connected to the input of first drive signal generating circuit 200, which may be implemented in a non-limiting manner as described above in relation to FIG. 1. The output of low pass filter 410 is connected to the input of AC gain circuit 170, and the output of AC gain circuit 170 is connected to a second adding input of summing circuit 180. The output of summing circuit 180, denoted control signal CS2, is connected via second optional DC gain circuit 190 to the input of second drive signal generating circuit 200, which may be implemented in a non-limiting manner as described above in relation to FIG. 1. The output of first drive signal generating circuit 200 represents a first driving signal, denoted D1 and exhibiting a duty cycle d1, and is connected to the control input of first electronically controlled switch 315. The output of second drive signal generating circuit 200 represents a second driving signal, denoted D2 and exhibiting a duty cycle d2, and is connected to the control input of second electronically controlled switch 315.

In operation, the cascaded DC-DC buck-boost converter of FIG. 3 operates in all manners similar to that of FIG. 2, described above, with the exception that: instead of amplifying the high frequency portion of the difference signal and generating first drive signal D1 responsive thereto, the low frequency portion of the difference signal is amplified by the operation of low pass filter 410, AC gain circuit 170 and summing circuit 180 and second drive signal D2 is generated responsive thereto; and the output current is controlled by feedback signal FB. Optionally, the gain of error amplifier 150, or the gains of one or more of optional DC gain circuits 190 are further adjusted to compensate. Amplifying the low frequency portion of the difference signal fed to second drive signal generating circuit 200 functions to relatively emphasize the high frequency portion of the difference signal fed to first drive signal generating circuit 200. The term relatively emphasized as used herein is irrespective of any flat band gain applied to any channel. Thus, in the event that the second drive signal has an emphasized low frequency portion of the difference signal and the first drive signal is driven directly responsive to the difference signal, the first drive signal is responsive to a relatively emphasized high frequency component as compared to the second drive signal.

Figure 5A:
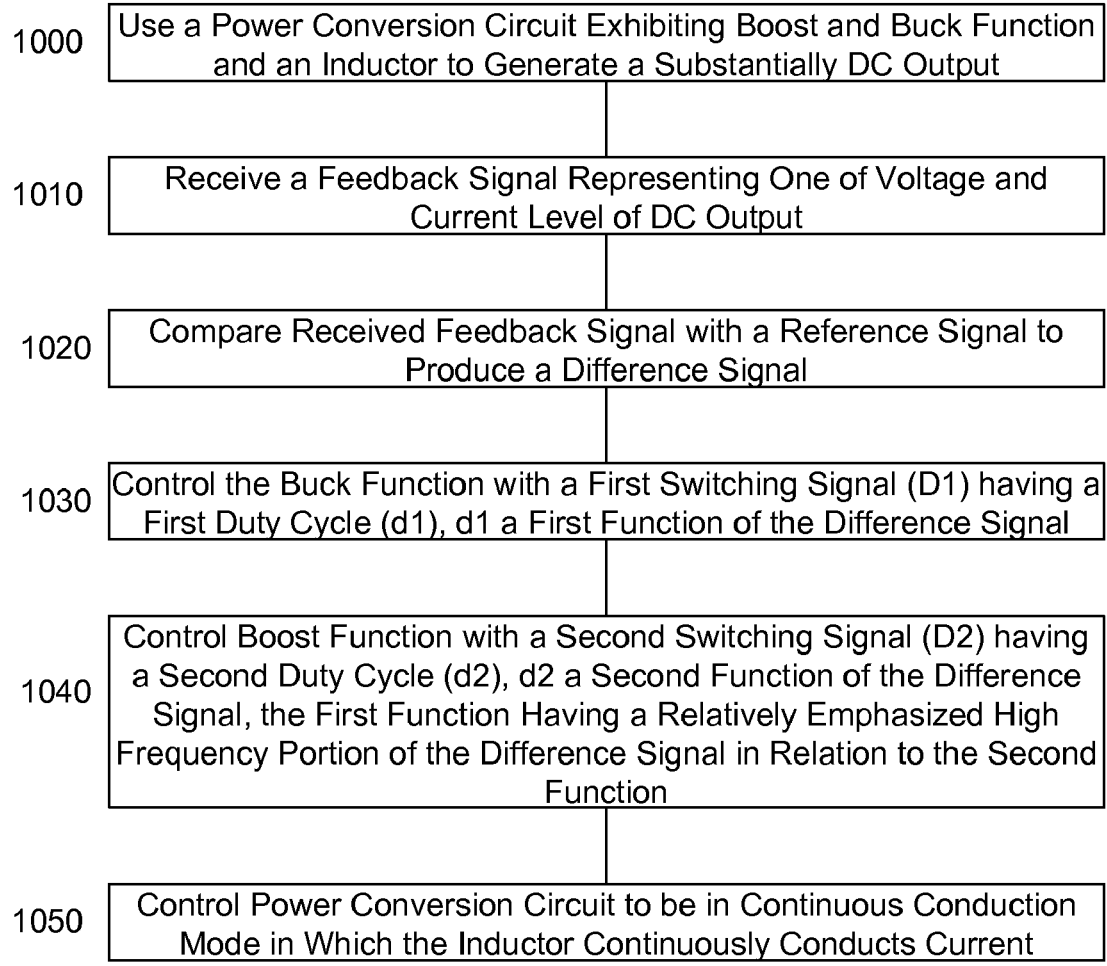
FIG. 5A is a high level flow chart of an exemplary method of modifying RHPZ.

FIG. 5A is a high level block diagram of an exemplary method of modifying RHPZ. In stage 1000 a power conversion circuit exhibiting a boost and buck function in cooperation with an inductor is used to generate a substantially DC output, typically from a substantially DC input. In an exemplary embodiment, the power conversion circuit is a cascaded buck-boost converter.

In stage 1010 a feedback signal is received representing one of the voltage and current level of the substantially DC output of stage 1000. In stage 1020 the feedback signal is compared with a reference signal to produce a difference signal.

In stage 1030 the buck function is controlled with a first switching signal exhibiting a first duty cycle, such as signal D1 with duty cycle d1 of FIGS. 1-4, the first duty cycle being a first function of the difference signal. In stage 1040 the boost function is controlled with a second switching signal exhibiting a second duty cycle, such as signal D2 with duty cycle d2 of FIGS. 1-4, the second duty cycle being a second function of the difference signal. The first function has a relatively emphasized high frequency portion of the difference signal in relation to the second function. The term relatively emphasized as used herein is irrespective of any flat band gain applied to any channel. Thus, in one embodiment the first function incorporates an amplified high frequency portion of the difference signal and in another embodiment the second drive signal has an emphasized low frequency portion of the difference signal and the first drive signal is driven directly responsive to the difference signal.

In stage 1050, the power conversion circuit of stage 1000 is controlled to be in continuous conduction mode with the first and second switching signals of stages 1030, 1040 to be in continuous conduction mode in which the inductor continuously conducts current.

Figure 5B:
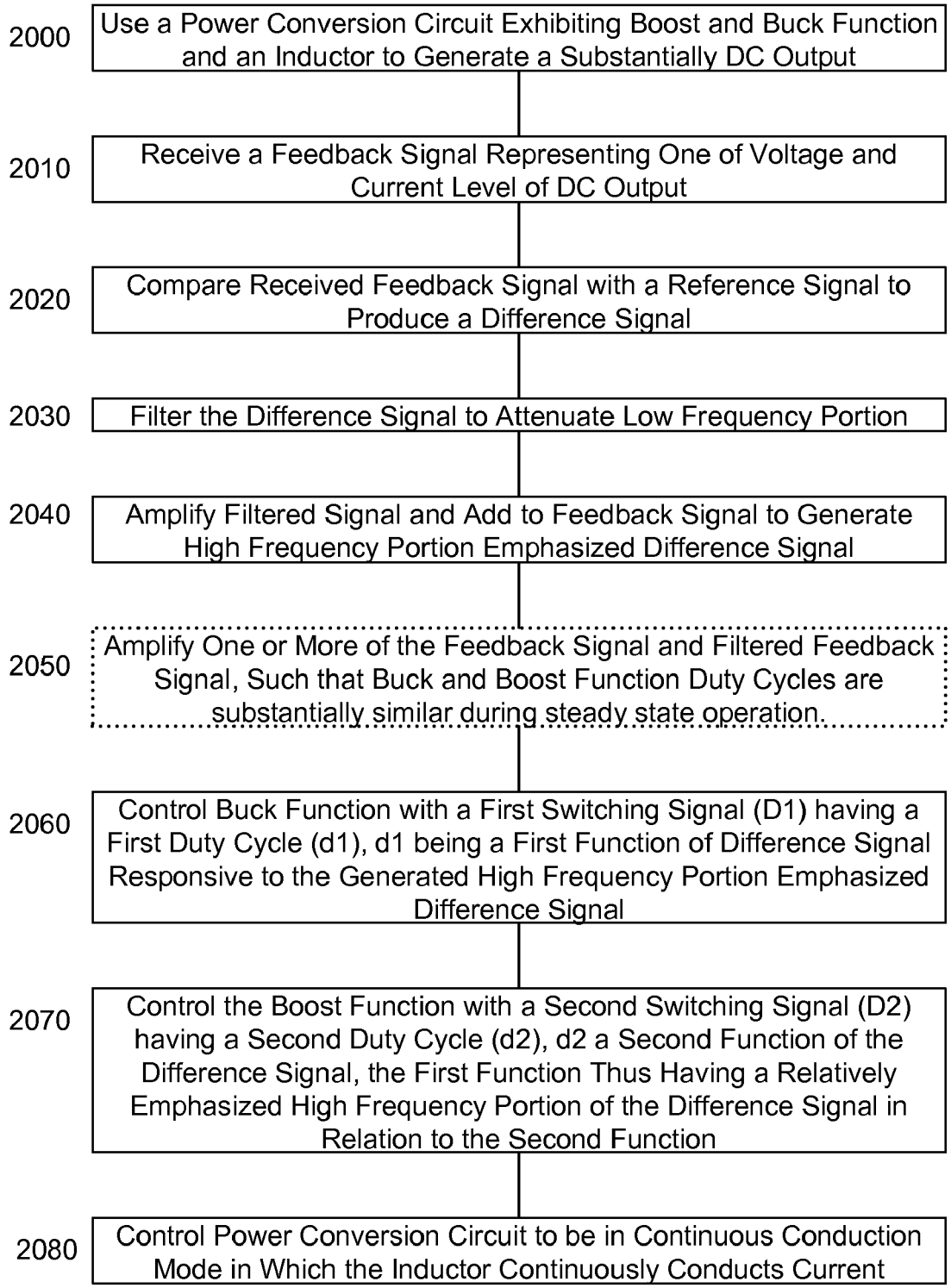
FIG. 5B is a high level flow chart of an exemplary method of modifying RHPZ where a high frequency component of a difference signal is amplified and the buck function is responsive thereto.

FIG. 5B is a high level block diagram of an exemplary method of modifying RHPZ where a high frequency component of a difference signal is amplified and the buck function is responsive thereto. In stage 2000 a power conversion circuit exhibiting a boost and buck function in cooperation with an inductor is used to generated a substantially DC output, typically from a substantially DC input. In an exemplary embodiment, the power conversion circuit is a cascaded buck-boost converter.

In stage 2010 a feedback signal is received representing one of the voltage and current level of the substantially DC output of stage 2000. In stage 2020 the feedback signal is compared with a reference signal to produce a difference signal.

In stage 2030 the difference signal is filtered to attenuate a low frequency portion of the difference signal. In one embodiment a representation of the difference signal is filtered to attenuate frequency components below a threshold frequency, in one non-limiting embodiment by a high pass filter, as described above in relation to FIGS. 1-2. In stage 2040, the filtered signal of stage 2030 is amplified and added to a representation of the difference signal, thus generating a high frequency portion emphasized difference signal.

In optional stage 2050 one or more of the high frequency emphasized difference signal and a representation of the difference signal are further amplified, preferably by a frequency neutral amplifier. Preferably, the amplification is selected such that the duty cycle of signals driving each of the buck and boost functions of the power conversion circuit of stage 2000 are substantially similar during steady state operation.

In stage 2060 the buck function is controlled with a first switching signal exhibiting a first duty cycle, such as signal D1 with duty cycle d1 of FIGS. 1-2 and 4, the first duty cycle being a function of the difference signal and particularly responsive to the generated high frequency portion emphasized difference signal. In stage 2070 the boost function is controlled with a second switching signal exhibiting a second duty cycle, such as signal D2 with duty cycle d2 of FIGS. 1-4, the second duty cycle being a function of the difference signal. Thus, the first function has a relatively emphasized high frequency portion of the difference signal in relation to the second function.

In stage 2080, the power conversion circuit of stage 2000 is controlled to be in continuous conduction mode, in particular the first and second switching signals of stages 2060, 2070 are controlled such that the inductor of stage 2000 continuously conducts current.

Figure 5C:
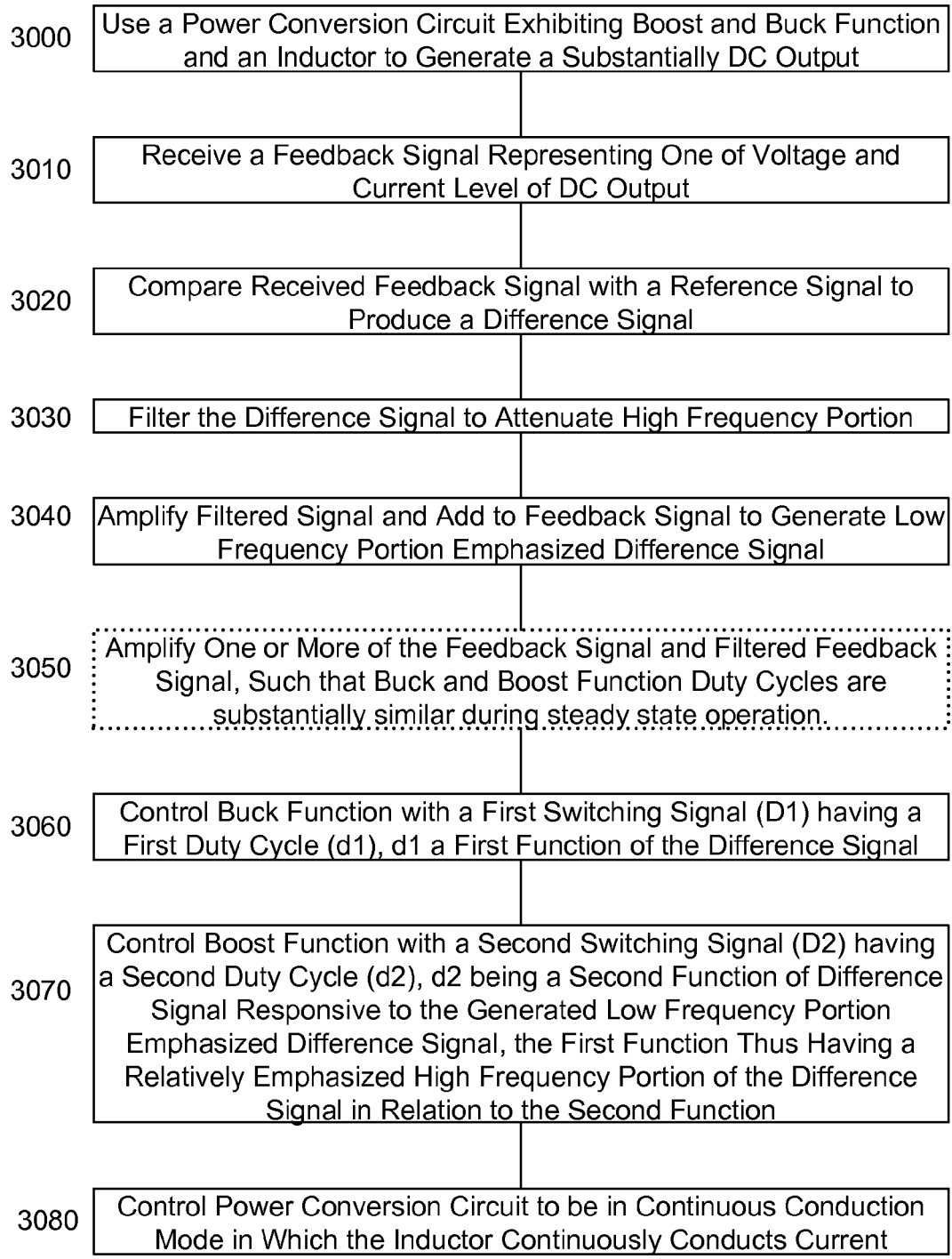
FIG. 5C is a high level flow chart of an exemplary method of modifying RHPZ where a low frequency component of a difference is amplified and the boost function is responsive thereto.

FIG. 5C is a high level block diagram of an exemplary method of modifying RHPZ where a low frequency component of a difference signal is amplified and the boost function is responsive thereto. In stage 3000 a power conversion circuit exhibiting a boost and buck function in cooperation with an inductor is used to generate a substantially DC output, typically from a substantially DC input. In an exemplary embodiment, the power conversion circuit is a cascaded buck-boost converter.

In stage 3010 a feedback signal is received representing one of the voltage and current level of the substantially DC output of stage 3000. In stage 3020 the feedback signal is compared with a reference signal to produce a difference signal.

In stage 3030 the difference signal is filtered to attenuate a high frequency portion of the difference signal. In one embodiment a representation of the difference signal is filtered to attenuate frequency components above a threshold frequency, in one non-limiting embodiment by a low pass filter, as described above in relation to FIG. 3. In stage 3040, the filtered signal of stage 3030 is amplified and added to a representation of the difference signal, thus generating a low frequency portion emphasized difference signal.

In optional stage 3050 one or more of the low frequency emphasized difference signal and a representation of the difference signal are further amplified, preferably by a frequency neutral amplifier. Preferably, the amplification is selected such that the duty cycle of signals driving each of the buck and boost functions of the power conversion circuit of stage 3000 are substantially similar during steady state operation.

In stage 3060 the buck function is controlled with a first switching signal exhibiting a first duty cycle, such as signal D1 with duty cycle d1 of FIGS. 3-4, the first duty cycle being a first function of the difference signal. In stage 3070 the boost function is controlled with a second switching signal exhibiting a second duty cycle, such as signal D2 with duty cycle d2 of FIGS. 3-4, the second duty cycle being a function of the difference signal and particularly responsive to the generated low frequency portion emphasized difference signal. Thus, the first function has a relatively emphasized high frequency portion of the difference signal in relation to the second function.

In stage 3080, the power conversion circuit of stage 3000 is controlled to be in continuous conduction mode in particular the first and second switching signals of stages 3060, 3070 are controlled such that the inductor of stage 300 continuously conducts current.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

What is claimed is:

1. A direct current to direct current power converter comprising:
   an energy storage element;
   a first switching circuit coupled between a substantially direct current (DC) input source and a first terminal of said energy storage element, wherein said first switching circuit comprises a first electronically controlled switch controlled by a first driving signal with a first duty cycle;
   a second switching circuit coupled between a second terminal of said energy storage element and a substantially DC output, wherein said second switching circuit comprises a second electronically controlled switch controlled by a second driving signal with a second duty cycle, and wherein the substantially DC output exhibits one of a voltage level and a current level that is controlled at least in part by the first duty cycle and the second duty cycle; and
   a control circuitry configured to receive a feedback signal indicative of the substantially DC output and to generate the first driving signal and the second driving signal responsive to a difference between the feedback signal and a reference signal, wherein the first duty cycle is responsive to a first function of the difference and the second duty cycle is responsive to a second function of the difference, the first function having an emphasized high frequency portion of the difference in relation to the second function, and wherein the first driving signal and the second driving signal respectively control said first electronically controlled switch and said second electronically controlled switch such that the direct current to direct current power converter operates in a continuous conduction mode wherein said energy storage element continuously conducts non-zero currents.

2. The direct current to direct current power converter of claim 1, wherein said control circuitry comprises a high pass filter in communication with a gain circuit and a summing circuit, said arrangement of the high pass filter, gain circuit and summing circuit operative to emphasize the high frequency portion of the difference.

3. The direct current to direct current power converter of claim 1, wherein said energy storage element is constituted of an inductor.

4. The direct current to direct current power converter of claim 1, wherein said first switching circuit performs a buck function and said second switching circuit performs a boost function.

5. The direct current to direct current power converter of claim 1, wherein said first switching circuit further comprises a third electronically controlled switch controlled by a third driving signal with a duty cycle complementary to the first duty cycle, said third electronically controlled switch coupled between the first terminal of said energy storage element and a reference potential, and said first electronically controlled switch is coupled between the substantially DC input source and the first terminal of said energy storage element.

6. The direct current to direct current power converter of claim 1, wherein said first switching circuit further comprises a first unidirectional electronic valve coupled between the first terminal of said energy storage element and a reference potential, and said first electronically controlled switch is coupled between the substantially DC input source and the first terminal of said energy storage element.

7. The direct current to direct current power converter of claim 1, wherein said second switching circuit further comprises a fourth electronically controlled switch controlled by a fourth driving signal with a duty cycle complementary to the second duty cycle, said fourth electronically controlled switch coupled between the second terminal of said energy storage element and the substantially DC output, and said second electronically controlled switch is coupled between the second terminal of said energy storage element and a reference potential.

8. The direct current to direct current power converter of claim 1, wherein said second switching circuit further comprises a second unidirectional electronic valve coupled between the first terminal of said energy storage element and a reference potential, and said second electronically controlled switch is coupled between the second terminal of said energy storage element and a reference potential.

9. The direct current to direct current power converter of claim 1, wherein said control circuitry comprises:
   an error amplifier configured to receive the reference signal and the feedback signal to generate an error signal responsive to the difference between the feedback signal and the reference signal;
   a filter circuit arranged to receive the error signal and configured to output a filtered error signal which substantially passes frequencies of the error signal above a threshold frequency and attenuates frequencies of the error signal below the threshold frequency;
   a gain circuit configured to receive the filtered error signal and output an amplified filtered error signal;
   a summing circuit configured to receive the amplified filtered error signal and the error signal and output a control signal, the control signal thus having an emphasized high frequency portion of the error signal; and
   a first drive signal generating circuit coupled to an output of the summing circuit and arranged to generate the first driving signal with the first duty cycle responsive to the control signal.

10. The direct current to direct current power converter of claim 9, wherein said control circuitry further comprises a second drive signal generating circuit coupled to the output of said error amplifier, and arranged to generate the second driving signal with the second duty cycle.

11. The direct current to direct current power converter of claim 9, wherein said control circuitry further comprises a first DC gain circuit arranged between the output of said summing circuit and the input of said first drive signal generating circuit.

12. The direct current to direct current power converter of claim 11, wherein said control circuitry further comprises a second drive signal generating circuit coupled to the output of said error amplifier, and arranged to generate the second driving signal with the second duty cycle.

13. The direct current to direct current power converter of claim 12, wherein said control circuitry further comprises a second DC gain circuit arranged between the output of said error amplifier and the input of said second drive signal generating circuit.

14. The direct current to direct current power converter of claim 13, wherein said first DC gain circuit and said second DC gain circuit have substantially similar gain factors, and wherein the first duty cycle and the second duty cycle are substantially similar during steady-state operation.

15. The direct current to direct current power converter of claim 1, wherein said control circuitry comprises:
   an error amplifier configured to receive the reference signal and the feedback signal to generate an error signal responsive to the difference between the feedback signal and the reference signal;
   a filter circuit arranged to receive the error signal and configured to output a filtered error signal which substantially passes frequencies of the error signal below a threshold frequency and attenuates frequencies of the error signal above the threshold frequency;
   a gain circuit configured to receive the filtered error signal and output an amplified filtered error signal;
   a summing circuit configured to receive the amplified filtered error signal and the error signal and output a control signal, the control signal thus having an emphasized low frequency portion of the error signal; and
   a drive signal generating circuit coupled to an output of the summing circuit and arranged to generate the second driving signal with the second duty cycle responsive to the control signal.

16. A method to generate a substantially direct current (DC) output, the method comprising:
   using a power conversion circuit capable of both a boost function and a buck function to generate the substantially DC output;
   receiving a feedback signal representing at least one of the voltage level and the current level of the generated substantially DC output;
   comparing the received feedback signal with a reference signal to produce a difference signal;
   controlling the buck function with a first switching signal having a first duty cycle, the first duty cycle being a first function of the difference signal; and
   controlling the boost function with a second switching signal having a second duty cycle, the second duty cycle being a second function of the difference signal, the first function having an emphasized high frequency portion of the difference signal in relation to the second function,
   wherein the first switching signal and the second switching signal are continuously enabled to facilitate a continuous conduction mode in which an energy storage element in the power conversion circuit continuously conducts current.

17. The method of claim 16, further comprising:
   filtering the difference signal so as to attenuate frequency portions of the difference signal below a threshold frequency while substantially passing frequency portions above the threshold frequency;
   amplifying the filtered difference signal; and
   adding the amplified filtered difference signal to the produced difference signal to generate a high frequency portion emphasized difference signal,
   wherein the first duty cycle is responsive to the high frequency portion emphasized difference signal.

18. The method of claim 17, further comprising amplifying the high frequency portion emphasized difference signal and the difference signal with substantially similar gain factors, wherein the first duty cycle and the second duty cycle are substantially similar during steady-state operation.

19. The method of claim 16, further comprising:
   filtering the difference signal so as to attenuate frequencies above a threshold frequency while substantially passing frequencies below the threshold frequency;
   amplifying the filtered difference signal; and
   adding the amplified filtered difference signal to the difference signal to generate a low frequency portion emphasized difference signal,
   wherein the second duty cycle is responsive to the low frequency portion emphasized difference signal.

20. The method of claim 16, wherein the energy storage element is constituted of an inductor.

* * * * *